(12) United States Patent
Shand et al.

(10) Patent No.: US 9,350,639 B2
(45) Date of Patent: May 24, 2016

(54) FORWARDING DATA IN A DATA COMMUNICATIONS NETWORK

(75) Inventors: Ian Michael Charles Shand, Reading (GB); Stewart Frederick Bryant, Reading (GB)

(73) Assignee: Cisco Technology, Inc., San Jose, CA (US)

( * ) Notice: Subject to any disclaimer, the term of this patent is extended or adjusted under 35 U.S.C. 154(b) by 152 days.

(21) Appl. No.: 11/851,255

(22) Filed: Sep. 6, 2007

(65) Prior Publication Data

US 2009/0067322 A1    Mar. 12, 2009

(51) Int. Cl.
| | |
|---|---|
| H04L 12/26 | (2006.01) |
| H04L 12/70 | (2013.01) |
| H04L 12/24 | (2006.01) |
| H04L 12/701 | (2013.01) |
| H04L 12/707 | (2013.01) |
| H04L 12/703 | (2013.01) |
| H04L 12/723 | (2013.01) |

(52) U.S. Cl.
CPC ............... *H04L 45/00* (2013.01); *H04L 45/22* (2013.01); *H04L 45/28* (2013.01); *H04L 45/50* (2013.01)

(58) Field of Classification Search
CPC ............ H04L 12/26; H04L 2012/5647; H04L 41/0654
USPC .................................................. 370/389, 392
See application file for complete search history.

(56) References Cited

U.S. PATENT DOCUMENTS

| | | | |
|---|---|---|---|
| 4,956,835 A * | 9/1990 | Grover ........................... | 370/228 |
| 6,148,410 A | 11/2000 | Baskey et al. | |
| 6,721,269 B2 * | 4/2004 | Cao et al. ....................... | 370/227 |
| 6,757,289 B1 | 6/2004 | Cain et al. | |
| 7,420,989 B2 | 9/2008 | Liu et al. | |
| 2002/0112072 A1 | 8/2002 | Jain | |
| 2002/0169712 A1 | 11/2002 | Ginzboorg et al. | |
| 2003/0117950 A1 | 6/2003 | Huang | |
| 2003/0195922 A1 | 10/2003 | Andrews et al. | |
| 2005/0007950 A1 | 1/2005 | Liu | |
| 2005/0013241 A1 | 1/2005 | Beller et al. | |
| 2005/0265228 A1 | 12/2005 | Fredette et al. | |
| 2006/0087965 A1 * | 4/2006 | Shand et al. ................... | 370/218 |

(Continued)

OTHER PUBLICATIONS

Andersson, et al., RFC 3036, LDP Specification, Standards Track, Jan. 2001 (http://www.ietf.org/rfc/rfc3036.txt).*

(Continued)

*Primary Examiner* — Brandon Renner
(74) *Attorney, Agent, or Firm* — Hickman Palermo Becker Bingham LLP

(57) ABSTRACT

In an embodiment, an apparatus for forwarding data in a data communications network having as components nodes and links therebetween comprises a network interface configured to couple to a data communications network having as components nodes and links therebetween; first logic which when executed is operable to receive a repair address; second logic which when executed is operable to compute a repair path from a repairing node to the repair address around a failure component on a primary forwarding path between the apparatus and a repairing node; and third logic which when executed is operable to propagate the repair address along a label switched path (LSP), comprising the repair path, to the repairing node. The apparatus offers improved efficiency in computing a repair path in a network around a failed component because unnecessary computations are not performed with the disclosed apparatus and approach.

19 Claims, 8 Drawing Sheets

(56) References Cited

U.S. PATENT DOCUMENTS

| | | | |
|---|---|---|---|
| 2006/0140111 A1* | 6/2006 | Vasseur et al. | 370/216 |
| 2006/0187819 A1* | 8/2006 | Bryant et al. | 370/216 |
| 2007/0041379 A1* | 2/2007 | Previdi | H04L 29/12783 370/392 |
| 2007/0115810 A1* | 5/2007 | Stamatelakis et al. | 370/228 |
| 2007/0201464 A1 | 8/2007 | Lv | |
| 2007/0297412 A1 | 12/2007 | Feng | |
| 2008/0025203 A1 | 1/2008 | Tallet | |
| 2008/0062861 A1* | 3/2008 | Shand | H04L 45/02 370/217 |
| 2008/0074997 A1* | 3/2008 | Bryant | H04L 45/02 370/227 |
| 2008/0089227 A1 | 4/2008 | Guichard et al. | |
| 2008/0219153 A1* | 9/2008 | Shand | H04L 45/04 370/225 |
| 2008/0239969 A1 | 10/2008 | He | |
| 2012/0275298 A1 | 11/2012 | Bryant et al. | |

OTHER PUBLICATIONS

"Notification of Transmittal of the International Search Report and the Written Opinion of the International Searching Authority, or the Declaration" received in International application No. PCT/US2008/074547 mailed Dec. 12, 2008 (9 pages).
Atlas, A., "Basic Specification for IP Fast-Reroute: Loop-free Alternates: draft-ietf-rtgwg-ipfrr-spec-base-06.txt" XP015049793, IETF Standard-Working-Draft, Internet Engineering Task Force (Mar. 1, 2007) 28 pages.
Bryant, S. et al., "IP Fast Reroute Using Not-via Addresses: draft-ietf-rtgwg-ipfrr-notvia-addresses-01.txt" XP015051639, IETF Standard-Working-Draft, Internet Engineering Task Force (Jul. 1, 2007) 24 pages.
U.S. Appl. No. 11/064,275, filed Feb. 22, 2005, Office Action, Nov. 9, 2009.
U.S. Appl. No. 11/064,275, filed Feb. 22, 2005, Notice of Allowance, Jul. 27, 2010.
CN $2^{nd}$ Office Action CN application No. 200680001652.0 dated Oct. 27, 2010.
Current claims for CN application No. 200680001652.0.
European Patent Office, Office Action from EP for foreign patent application No. 08 798 837.4-1525, Applicant: Cisco Systems Inc., dated Jul. 1, 2011, 4 pages.
Current claims in EP for foreign patent application No. 08 798 837.4-1525, Applicant: Cisco Systems Inc., dated Jul. 2011, 3 pages.
European Patent Office, Office Action from EP for foreign patent application No. 06720965.0-1525, Applicant: Cisco Systems Inc., Dated May 2, 2011 (5 pgs).
Current claims in EP for foreign patent application No. 06720965.0-1525, Applicant: Cisco Systems Inc., Dated May 2011, 3 pages.
U.S. Appl. No. 11/968,499, filed Jan. 2, 2008, Office Action, Jan. 6, 2012.
Chinese Patent Office, CN Office Action received in International Application No. 200880105670.2 dated Dec. 23, 2011 (4 pages).
Current Claims, Application No. 200880105670.2 ( 3 pages).
S. Bryant et al., entitled "Internet Draft IP Fast Reroute Using Notvia Addresses" dated Mar. 2005 (13 pages).
Bryant S. et al., "Internet Draft IP Fast Reroute Using Notvia Addresses" Network Working Group, Internet Draft, Dated Jul. 2007, 24 pages.
Bryant S. et al., Internet Draft IP Fast Reroute Using Notvia Addresses, Network Working Group, Internet Draft, Dated Mar. 2005, 13 pages.
European Patent Office, "Office Action", in application No. 08 798 837.4-1525, dated Feb. 5, 2013, 8 pages.
Current Claims in application No. 08 798 837.4-1525, dated Feb. 2013, 3 pages.
Balon et al., "A Scalable and Decentralized Fast-Rerouting Scheme With Efficient Bandwidth Sharing" dated Dec. 2004, 21 pages.
Previdi, Stefano, "IP FAST ReRoute Technologies", Cisco Systems, dated 2006, 60 pages.
State Intellectual Property Office of the People's Republic of China, "The Fourth Office Action" in application No. 200880105670.2, dated Nov. 27, 2013, 4 pages.
Current Claims in application No. 200880105670.2, dated Nov. 2013, 2 pages.
European Patent Office, "Office Action" in application No. 06 720 965.0-1505, dated Apr. 25, 2013, 6 pages.
Current Claims in application No. 06 720 965.0-1505, dated Apr. 2013, 5 pages.
State Intellectual Property Office of the People's Republic of China, "Third Office Action" in application No. 200880105670.2 dated May 10, 2013, 16 pages.
Current Claims in application No. 200880105670.2 dated May 2013, 2 pages.
Balon, Simon, "A Scalable and Decentralized Fast-Rerouting Scheme With Efficient Bandwidth Sharing", Computer Networks, Science Direct, Dated Jan. 31, 2005, 18 pages.
European Patent Office, "Search Report" in application No. 06 720 965.0-1505, dated Jul. 28, 2015, 7 pages.
European Claims in application No. 06 720 965.0-1505, dated Jul. 2015, 5 pages.

* cited by examiner

| LABEL IN | LABEL OUT | NEXT HOP |
|---|---|---|
| 900 | 902 | 904 |
| $L''_{Ba}$ | $L'_{Ba}$ | Z |

| DESTINATION | LABEL OUT | NEXT HOP |
|---|---|---|
| 1100 | 1102 | 1104 |
| Ba | $L'''_{Ba}$ | X |

FORWARDING DATA IN A DATA COMMUNICATIONS NETWORK

TECHNICAL FIELD

The present disclosure generally relates to data communications networks. The invention relates more specifically to approaches for forwarding data in a data communications network.

BACKGROUND

Unless otherwise indicated herein, the approaches described in this section are not prior art to the claims in this application and are not admitted to be prior art by inclusion in this section.

In computer networks such as the Internet, packets of data are sent from a source to a destination via a network of elements including links (communication paths such as telephone or optical lines) and nodes (for example, routers directing the packets along one or more of a plurality of links connected to it) according to one of various routing protocols.

One class of routing protocol is the link state protocol. The link state protocol relies on a routing algorithm resident at each node. Each node on the network advertises, throughout the network, links to neighboring nodes and provides a cost associated with each link, which can be based on any appropriate metric such as link bandwidth or delay and is typically expressed as an integer value. A link may have an asymmetric cost, that is, the cost in the direction AB along a link may be different from the cost in a direction BA. Based on the advertised information in the form of a link state packet each node constructs a link state database (LSDB), which is a map of the entire network topology, and from that constructs generally a single optimum route to each available node based on an appropriate algorithm such as, for example, a shortest path first (SPF) algorithm. As a result a "shortest path spanning tree" (SPT) is constructed, rooted at the node and showing an optimum path including intermediate nodes to each available destination node. The results of the SPF are stored in a routing information base (RIB) and based on these results the forwarding information base (FIB) or forwarding table is updated to control forwarding of packets appropriately. When there is a network change a link state packet representing the change is flooded through the network by each node adjacent the change, each node receiving the link state packet sending it to each adjacent node.

As a result, when a data packet for a destination node arrives at a node, the receiving node identifies the optimum route to that destination and forwards the packet to the next node along that route. The next node repeats this step and so forth.

In normal forwarding each node decides, irrespective of the node from which it received a packet, the next node to which the packet should be forwarded. In some instances this can give rise to a "loop," in which the forwarding decisions of a group of nodes result in endlessly forwarding packets in a loop among the nodes, without reaching the destination. In particular, loops can occur when the databases (and corresponding forwarding information) are temporarily de-synchronized during a routing transition. For example, because of a change in the network, a new LSP may be propagated that induces creating a loop in the RIB or FIB. As a specific example, if node A sends a packet to node Z via node B, comprising the optimum route according to its SPF, node B, according to its SPF could determine that the best route to node Z is via node A and node B then could send the packet back. Looped forwarding can continue for as long as the loop remains represented in the RIB or FIB, although usually the packet will have a maximum hop count after which it is discarded. Such a loop can be a direct loop between two nodes or an indirect loop around a circuit of nodes.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
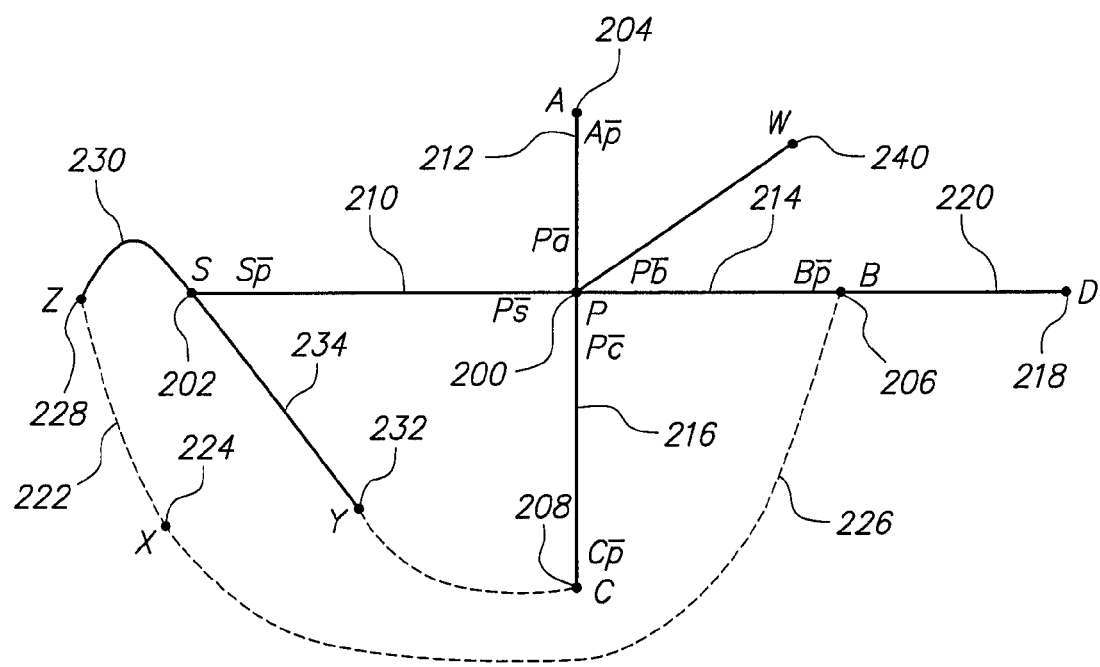
FIG. 1 is a representation of a network illustrating a method of constructing a repair path.

A method and apparatus for forwarding data in a data communication network are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
   2.0 Structural and Functional Overview
      2.1 Overview of First Approach for Forwarding Data
      2.2 Overview of Second Approach for Forwarding Data
   3.0 Example Implementation of Second Approach for Forwarding Data in a Data Communications Network
   4.0 Implementation Mechanisms—Hardware Overview
   5.0 Extensions and Alternatives
   1.0 General Overview The needs identified in the foregoing Background, and other needs and objects that will become apparent for the following description, are achieved in the present invention, which comprises, in one aspect, an apparatus for forwarding data in a data communications network having as components nodes and links therebetween comprises a network interface configured to couple to a data communications network having as components nodes and links therebetween; first logic which when executed is operable to receive a repair address; second logic which when executed is operable to compute a repair path from a repairing node to the repair address around a failure component on a primary forwarding path between the apparatus and a repairing node; and third logic which when executed is operable to propagate the repair address along a label switched path (LSP), comprising the repair path, to the repairing node. The apparatus offers improved efficiency in computing a repair path in a network around a failed component because unnecessary computations are not performed with the disclosed apparatus and approach.

In one feature, the LSP comprises a multi protocol label switching LSP. In another feature, the apparatus further comprises logic which when executed is operable to propagate a path vector identifying nodes on the repair path together with the repair address. In a further feature, the path vector identifies only nodes between a propagating node and a repairing node.

In yet another feature, the failure component comprises at least one of a node, a link and a shared risk link group (SRLG). In still another feature, the repair is computed according to a link state protocol.

In a further feature, the repair path is computed by performing an incremental shortest path first (iSPF) process rooted at the repairing node. In another feature, the apparatus further comprises logic which when executed is operable to compute whether a loop free alternate (LFA) repair path is available at the repairing node and to compute only a repair path from the repairing node and to propagate the repair address if no LFA is available.

In another feature, the apparatus further comprises logic which when executed is operable to refresh the repair paths at intervals. In still another feature, the apparatus further comprises logic which when executed is operable to withdraw unrefreshed paths. In another feature, the apparatus further comprises a repairing node further comprising logic which when executed is operable to forward data along the LSP upon failure of the failure component.

In other aspects, the invention encompasses a computer apparatus and a computer-readable medium configured to carry out the foregoing steps.

2.0 Structural and Functional Overview 2.1 Overview of First Approach for Forwarding FIG. 1 illustrates an example network in which a first approach for forwarding data in a network may be applied. The network includes a primary node P, reference numeral 200, a source node S, and nodes, A, B and C, reference numerals 202, 204, 206, 208 each connected to node P via respective links 210, 212, 214, 216. A further node D, reference numeral 218 is connected to node B via link 220. In addition to the standard addresses assigned to each node, each interface in the network is assigned an additional repair address, termed a "notvia address." A packet addressed to a notvia address must be delivered to the router with that address, and not via the neighboring router on the interface to which that address is assigned.

For example the interfaces from node P to nodes S, A, B, C by respective links 210, 212, 214, 216, may have addresses P$\bar{a}$, P$\bar{b}$, P$\bar{c}$ and P$\bar{s}$. Similarly the interfaces from nodes A, B, C and S to node P via links 212, 214, 216, 210 respectively in the opposite direction have addresses A$\bar{p}$, B$\bar{p}$, C$\bar{p}$, S$\bar{p}$.

To repair a failure, a repairing node, for example node S, encapsulates the packet to the notvia address of the node interface on the far side of the failure. The nodes on the repair path then know to which node they must deliver the packet, and which network component they must avoid.

Referring to FIG. 1, assuming that S has a packet for some destination D that it would normally send via P and B, and that S suspects that P has failed, S encapsulates the packet to B$\bar{p}$. The path from S to B$\bar{p}$ is determined as the shortest path from S to B not going via P. If the network contains a path from S to B that does not transit router P, then the packet will be successfully delivered to B. For example the packet may be forwarded along path 222 to node X, 224, and then path 226 to node D. Because node X has calculated a repair path for B$\bar{p}$ it will forward the encapsulated packet correctly. When the packet addressed to B$\bar{p}$ arrives at B, B removes the encapsulation and forwards the repaired packet towards its final destination, which is node D.

Figure 2:
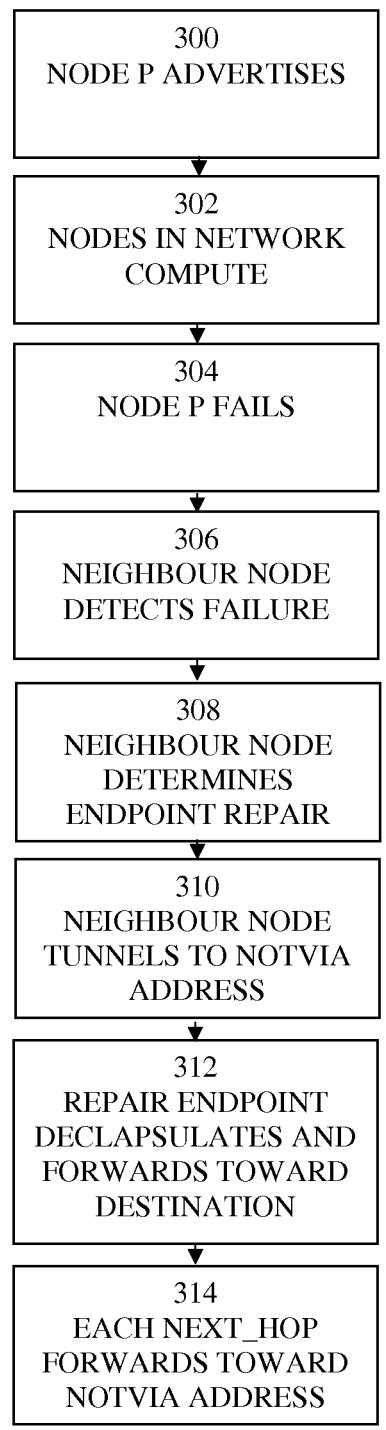
FIG. 2 is a flow diagram illustrating a method of constructing a repair path.

The foregoing approach can be further understood with reference to FIG. 2, which is a flow diagram illustrating at a high level the method applied herein.

In block 300, node P advertises, using a notification such as a link state packet, its adjacencies A, B, C, S and its associated notvia addresses P$\bar{a}$, P$\bar{b}$, P$\bar{c}$, P$\bar{s}$. All other nodes, acting as notifying nodes, will also issue similar link state packets. As a result, not only can appropriate forwarding tables be constructed, but also notvia addresses are available for each node in the event that it fails or otherwise becomes a non-available node, in which case the notvia address can be used as the repair address.

Accordingly, in block 302, all participating nodes compute their next hops not only for each normal (non-failed) address but also for each notvia address. As a result, each node constructs a repair path around each other node in the network and stores it against the corresponding notvia address.

In the event that node P subsequently fails or otherwise becomes unavailable, in block 304, then in block 306 the neighbor nodes detect or are notified of the failure in any appropriate manner. If a neighbor node subsequently receives a packet which it would have sent to the failed component as its next hop, then—acting as a repairing node—the neighbor node identifies a repair end point or target to which it must tunnel such a packet to reach its subsequent destination in block 308.

In the example given above, the repairing node is node S, and repair end point is node B for a packet with destination D, identified by the respective notvia address B$\bar{p}$. As a result the node S tunnels the packet along the repair path to B$\bar{p}$ in block 310.

In block 312 each next hop forwards the encapsulated packet towards the notvia address B$\bar{p}$; for example, node X in FIG. 1 forwards the packet correctly. Because all of the participating nodes have calculated a path to the notvia address using the same repair topology, a packet is forwarded using normal IP forwarding without the requirement for extensions to the forwarding code. In block 314 the packet arrives at the repair end point which decapsulates the packet and forwards the original packet towards its destination, again using normal IP forwarding for destination D in the example described.

Referring again to FIG. 1, to allow each enabled node on the network to construct a repair topology for a failed network component (link or node), each node must advertise its notvia addresses as well as the other relevant information stored in its link state packet.

Figure 3:
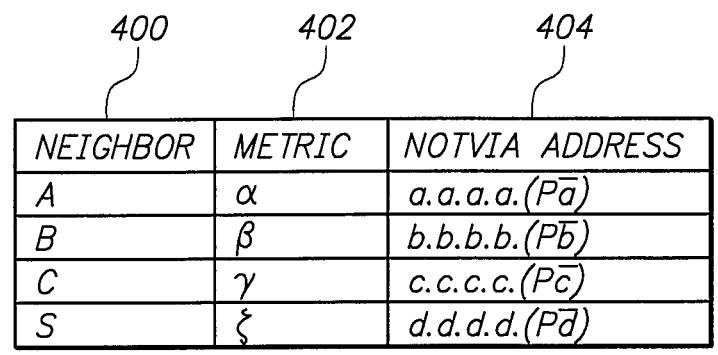
FIG. 3 is a schematic representation of information carried in an LSP.

FIG. 3 is a diagram showing schematically the information contained in a link state packet issued by node P. In addition to advertisement of each neighbor and its associated metric (e.g. the cost associated with the respective link), further information is provided. For example, where the neighbor information is provided in column 400 and the associated metric in column 402, in addition a notvia address for each neighbor is provided in column 404. The notvia address is associated with the respective neighbor such that the entry against neighbor A effectively designates $\overline{Pa}$. As long as the semantic is recognized by nodes receiving the link state packet, then the notvia address itself can take the form of an Internet Protocol address, shown in FIG. 3 as "a.a.a.a" representing $\overline{Pa}$ and so forth. As every node in the network provides similar information, each node can derive repair paths for every notvia address on the network.

As a result, every node more generally calculates the path it would use in the event of any possible node failure, as seen in the example of FIG. 1, in which node S encapsulates a packet destined for node D to $P\overline{b}$ in the event of failure of node P. Each node therefore hypothetically fails every other router in the network, one at a time, and calculates its own best route to each of the neighbors of that node. In the context of FIG. 1, some router X will consider each router in turn to be P, fail P, and then calculate its own route to each of the notvia P addresses advertised by the neighbors of P. i.e. X calculates its route to $S\overline{p}$, $A\overline{p}$, $B\overline{p}$ and $C\overline{p}$, in each case, not via P.

Figure 4:
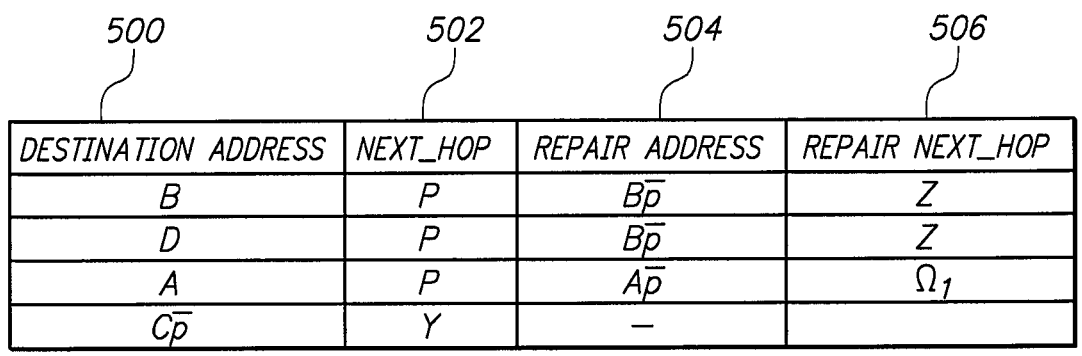
FIG. 4 is a diagram illustrating a forwarding table constructed at a neighbor node to a non-available node.

FIG. 4 is a diagram illustrating relevant parts of the forwarding table derived at node S. For each address (column 500), the next hop (column 502) is derived, a notvia address (column 504) is designated and a corresponding repair address (column 506) is also implemented. For example, where the destination is node B and the next hop is calculated as node P, then in addition, the repair address $B\overline{p}$ to which the packet will be tunneled is stored together with the corresponding repair next hop. In this case this is the first hop along the path 222 from node S to node X in the example of FIG. 1; the first hope is indicated as node Z, reference numeral 228 along link 230 from node S.

In the case of packets destined for node D, the normal next hop is node P and the repair address is $B\overline{p}$ as a result of which the repair next hop is once again node Z for packets encapsulated to $B\overline{p}$. If node A is the destination address, then the next hop is node P and the repair address is $A\overline{p}$ providing some repair next hop $\Omega_1$ (not shown). The repair addresses in node S's forwarding table will always be to a neighbor's neighbor, which is the repair tunnel endpoint. However where the normal address in column 500 is a notvia address, for example C $\overline{p}$, then although a next hop is provided as node Y, reference numeral 232 along link 234 from node S, a repair address and repair next hop are not provided. As a result, node S will forward a packet using normal forwarding to a notvia address, when it lies in another node's repair path, but will not instigate a repair tunneled to a notvia address when the incoming packet is already destined for a notvia address.

In this approach, the SPF calculation overhead can be reduced using incremental SPFs (iSPF). In general, an incremental SPF is implemented by removing a component from the SPT and reattaching all components previously reachable via the excised component. The SPF algorithm can be terminated when all of the components are reattached, rather than re-computing the entire SPF for all components. However, the approach of this section requires significant computation to obtain notvia addresses for all or a large proportion of the network even though notvia address FIB entries will only ever be required at the nodes along the repair path.

2.2 Overview of Second Approach for Forwarding Data

Figure 5:
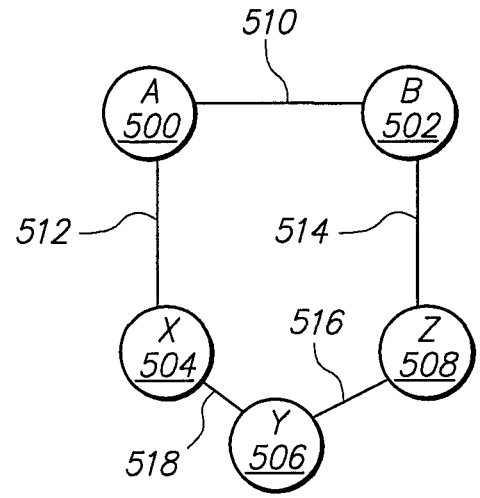
FIG. 5 is a representation of a network illustrating an approach for forwarding data in a network.

A second approach for forwarding data in a data communications network is now described with reference to FIG. 5 and FIG. 6. FIG. 5 depicts an illustrative network to which the approach can be applied and FIG. 6 is a flow diagram showing at a high level steps involved in the approach described herein.

As seen in FIG. 5, a simple network configuration includes nodes A, B, X, Y, Z reference numerals 500, 502, 504, 506, and 508. Node A is connected to node B and X by respective links 510, 512, and node Z is connected to respective nodes B and Y by links 514, 516. Node X is connected to node Y by link 518. If node B comprises an apparatus for forwarding data, then node B can have, for example, a repair address Ba for use in the event of failure of link 510, the repair address corresponding to its interface with link 514 to node Z.

Figure 6:
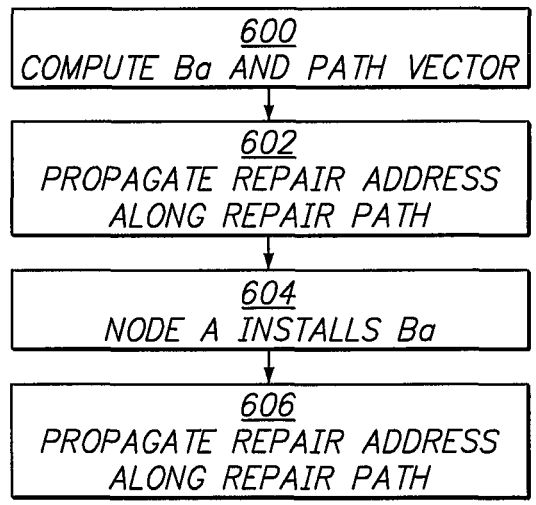
FIG. 6 is a flow diagram illustrating in more detail an approach for forwarding data in a network implemented at a repair end point node.

Referring now to FIG. 6, in the event of the failure of link 510 as failure component in a primary path from a repairing node A, to a repair end point node B at step 600 node B computes the repair path from Node A to node B's repair address Ba. For example, the repair path may include a path vector, that is, a listing of the nodes in the repair path—in this case nodes A, X, Y, Z. As will be seen, accordingly, instead of all nodes computing notvia addresses, only the node adjacent to the failure (the repair end point node B) need compute the paths for its own notvia addresses.

At step 602, the repair end point node then distributes the repair information only to the nodes along the path. For example, the repair end point node propagates the repair address along a path according to the path vector comprising the repair path Ba Z Y X A to the repairing node to create a label switched path. The label switched path may be created using label distribution protocol (LDP), which is capable of passing path vectors along with the address label mappings, and which can be used to optimize the computation and distribution of the notvia address information. LDP is described, for example, in L. Andersson et al., "LDP Specification," Internet Engineering Task Force (IETF) Request for Comments (RFC) 3036, January 2001.

At step 604, having received the repair address via LDP, node A installs the notvia address Ba for use as a repair address in the event of failure of link 510, together with the associated labels. At step 606, upon failure of link 510, node A can repair packets for destinations that otherwise would have been reachable over link 510, by injecting them into the repair path X, Y, Z, Ba. Upon receipt of the packet, node B can either process the packet if the packet is destined for node B, or forward the packet to its destination as appropriate.

As a result of the approach described herein, each node only computes notvia paths for its own neighbors and not all nodes in the network, restricting the computations to the respective repair paths.

Figure 7A:
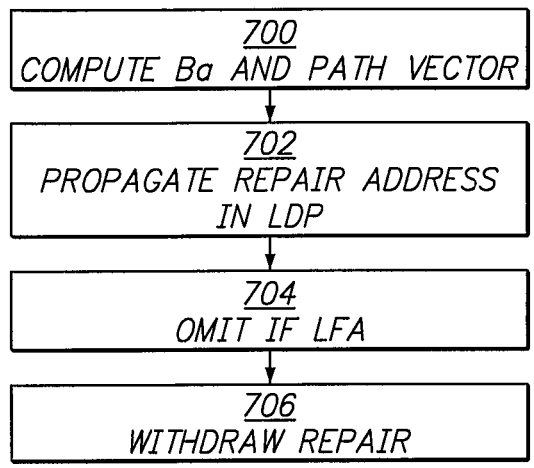
FIG. 7A is a representation of a network illustrating in more detail an approach for forwarding data in a network.
Figure 7B:
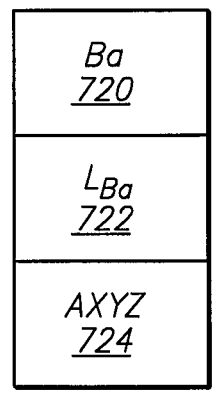
FIG. 7B shows an LDP message propagated by node B.

3.0 Example Implementation of Second Approach for Forwarding Data in a Data Communications Network FIG. 7A is a flow diagram illustrating in more detail steps performed at a repair end point node such as node B. FIG. 7B shows an LDP message propagated by node B.

Referring first to FIG. 7A, at step 700 node B computes the repair path from node A to its repair address Ba not via link 510. For example, the repair path can be computed by running an SPF computation rooted at node A with the link 510 failed, or a reverse iSPF rooted at node B with the link failed. In addition, the path vector is computed.

At step 702, the repair address is propagated using LDP. For example, a tuple in the form shown in FIG. 7B is sent including the notvia address Ba in field 720, B's label for the notvia address $L_{Ba}$, in field 722, and the path vector in field 724.

In other contexts, LDP and label switched paths may be used to implement MPLS (multi protocol label switching). MPLS is described, for example, in E. Rosen et al., "Multiprotocol Label Switching Architecture," IETF RFC 3031, January 2001. According to MPLS, a complete path for a source-destination pair is established, and values required for forwarding a packet between adjacent routers in the path, together with headers or "labels" are pre-pended to the packet. The labels are used to direct the packet to the correct interface and next hop. The labels precede the IP or other header allowing smaller outer headers.

A label switched path for a source-destination pair can be established according to various different approaches. One such approach is LDP in which each router in the path to a destination sends its label for packets to that destination to the next router back along the path in the direction toward the source as determined from its IP routing table. Then, when a router needs to forward a packet for the destination, the router identifies its next hop router to the destination and appends the label received from the next hop router. Alternatively, resource reservation protocol (RSVP) can be invoked in which case, for example, a network administrator can engineer a path providing strict source routing. RSVP is described, for example, in R. Braden et al., "Resource ReSerVation Protocol (RSVP) Version 1 Functional Specification," IETF RFC 2205, September 1997.

In an embodiment, the LDP message is propagated along the path according to the ordering in the path vector. Normal address label mappings are distributed in the normal manner. Accordingly, the repair path is laid in requiring computation of the path notvia address Ba only at the repair end point node, such as node B in the present example.

Further, as part of step 704, in an optimization, one or more alternative repair mechanisms such as loop free alternatives (LFA) may be in place. LFAs comprise neighbor nodes to a repairing node that have a cost to a destination node that is less than the cost of the neighbor node to the repairing node plus the cost from the repairing node to the destination node. LFAs can be implemented to replace notvia repairs where destinations are served with such alternative repairs. Thus node B can compute, based on the link state information it has in relation to node A, whether node A has LFAs in which case node B does not have to propagate the LDP message with the notvia repair information as node A already has a repair path.

At step 706, withdrawal of unused notvia paths can be performed in appropriate circumstances. For example when a repair path is no longer required—say after convergence of the network—node B can send a label withdrawal message down the repair path, withdrawing the path. Alternatively, a soft state mechanism can be implemented refreshing notvia paths at regular intervals, for example thirty minutes, and allowing un-refreshed paths to die.

Figures 8, 9:
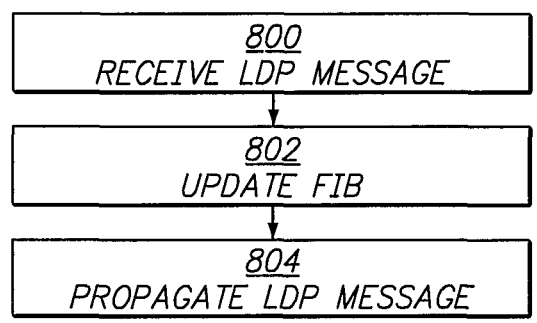
FIG. 8 is a flow diagram illustrating in more detail an approach for forwarding data in a network implemented at a repair path node.
FIG. 9 is a diagram illustrating a forwarding table constructed according to the approach described herein at the repair path node.

FIG. 8 is a flow diagram illustrating steps performed at an intermediate or repair path node along the repair path, for example node Z.

At step 800, the LDP message is received, and at step 802 node Z installs a FIB entry mapping its own label for Ba, $L'_{Ba}$ to B's label $L_{Ba}$ with the output interface to B.

After updating of node Z's forwarding table at step 802, at step 804 node Z propagates the LDP message together with its own label for Ba, $L_{Ba}$, to the next node in the path vector, node Y. Optionally, rather than propagating the entire tuple shown in FIG. 7B, node Z can only propagate the remaining elements of the path vector, such that nodes Z sends to node Y the path vector A X.

FIG. 9 is a diagram illustrating a forwarding table constructed according to the approach described herein at the repair path node. The FIB update at node Y can be understood with reference to FIG. 9. At column 900 Y's label for $B_a$, $L''_{Ba}$, comprises the incoming label which is swapped with the outgoing label in at column 902 received from node Z, $L'_{Ba}$ and sent to the next hop specified column 904, node Z.

Figures 10, 11:
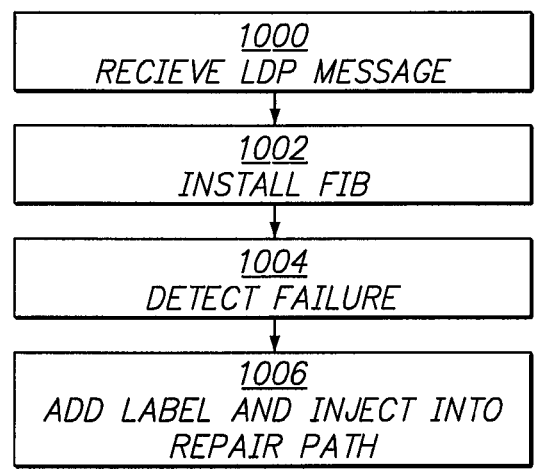
FIG. 10 is a flow diagram illustrating in more detail the approach described herein at a repairing node.
FIG. 11 is a diagram that illustrating a forwarding table constructed at the repairing node.

FIG. 10 is a flow diagram illustrating in more detail the approach described herein at a repairing node; FIG. 11 is a diagram that illustrating a forwarding table constructed at the repairing node. Referring first to FIG. 10, at step 1000 node A receives the LDP message and at step 1002 node A installs a FIB entry for the repair path.

In FIG. 11, in destination field 1100 packets for destinations that would otherwise traverse the failure component, upon detected failure of the component, are forwarded to notvia address Ba. For a destination D, for example, normally node A would append B's label for D, $B_D$. In the case of failure, the label received from node X $L'''_{Ba}$ is stored in the label out field 1102 and the next hop for the repair path LSP, node X is stored at field 1104.

At step 1004 of FIG. 10, upon detection of failure of the failure component 510, and at step 1006 node X's label $L'''_{Ba}$ is prepended to the packet and the packet is injected into the repair path in a label stack [$L'''_{Ba}$, $B_D$] to node X from which it is passed along the label switched path. Upon receipt of the packet at node B the label $L_{Ba}$ is removed or this can be removed at node Z using "penultimate hop-hopping" and the packet is either processed at node B or forwarded on to its eventual destination swapping $B_D$ for the corresponding egress label as appropriate.

Although the above discussion relates to failure of link 510, node failure can be accommodated in the same manner. In that case, for example, a repair end point node will compute a repair path from a repairing node around a failure component comprising a node on a primary path therebetween, and send the repair address and path vector along the repair path to the repairing node after which operation will proceed in the same manner as set out above. In a similar way, failures comprising shared risk link groups (SRLG) can equally be accommodated by computing a repair path with all members of the SRLG that failed.

When the new path is received at a node, then the new path will replace any old path for the not-via address with immediate effect.

As a result of the approach described herein, not only is the amount of repair path computation minimized, but in addition use is made of the existing capabilities of LDP such that it is not necessary to create, deploy or invest in new protocols just to pass the relevant repair path information.

The approach as described herein can be implemented in any particular manner for example, using conventional LDP or modified LDP as appropriate to carry the path vector and, at intermediate nodes along the repair path, to remove unnecessary components from the path vector. Installation of the FIB and management of repair capability can be implemented at node A in any appropriate manner and the steps described herein can all be implemented hardware, software or firmware as appropriate.

According to an alternative approach, the LDP message can be propagated to all nodes but labels are only installed at nodes which identify themselves from the path vector as being on the path. Accordingly, in a further alternative approach if the repair end point node advertises its capability to restrict notvia computation only to neighbor failures, for example in the IGP, other nodes in the network need only compute their notvia paths for nodes from which such an advertisement was not received otherwise relying on receipt of the repair address and path vector for capable repair end point nodes.

4.0 Implementation Mechanisms—Hardware Overview

Figure 12:
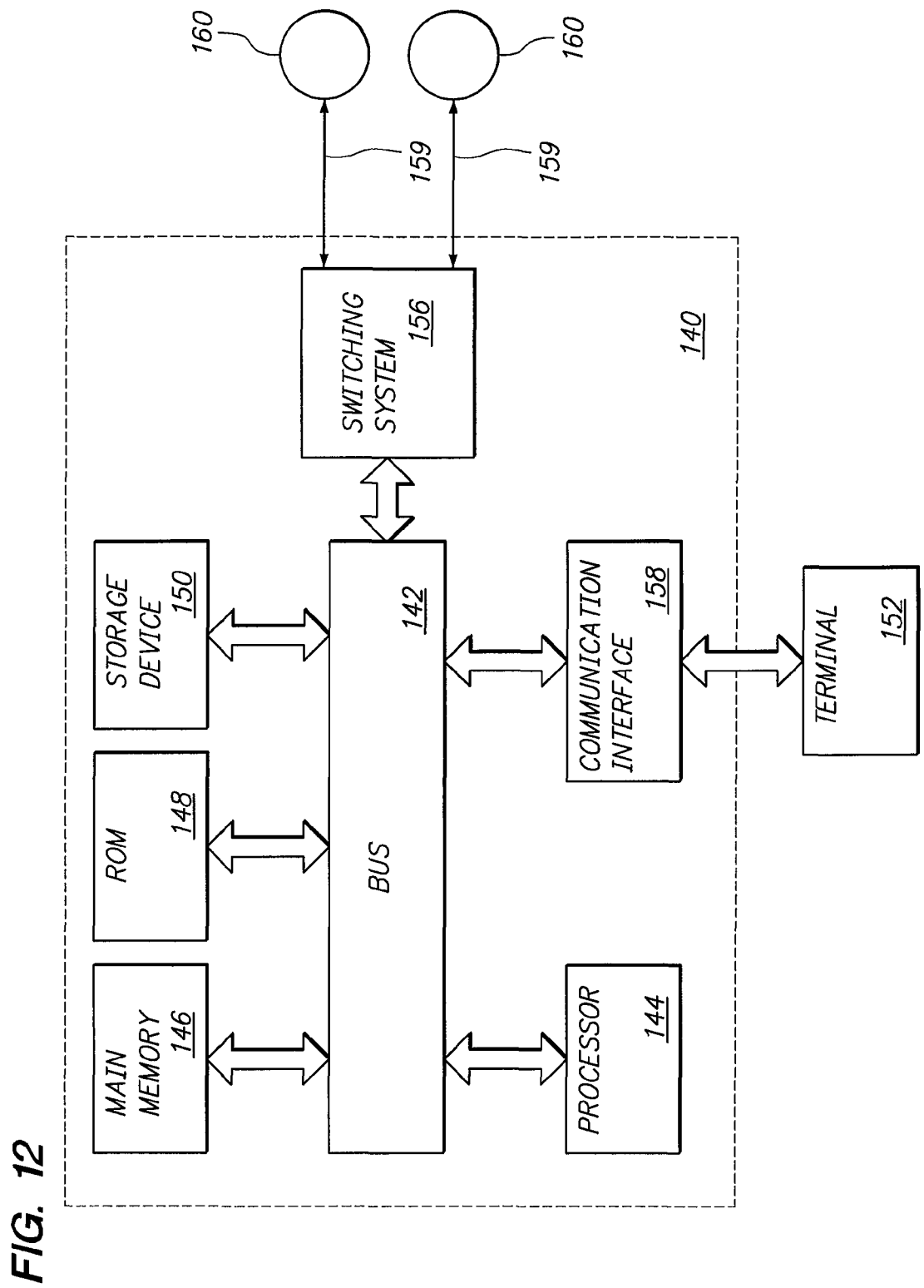
FIG. 12 is a block diagram that illustrates a computer system upon which a method for constructing a repair path maybe implemented.

FIG. 12 is a block diagram that illustrates a computer system 40 upon which the method may be implemented. The method is implemented using one or more computer programs running on a network element such as a router device. Thus, in this embodiment, the computer system 140 is a router.

Computer system 140 includes a bus 142 or other communication mechanism for communicating information, and a processor 144 coupled with bus 142 for processing information. Computer system 140 also includes a main memory 146, such as a random access memory (RAM), flash memory, or other dynamic storage device, coupled to bus 142 for storing information and instructions to be executed by processor 144. Main memory 146 may also be used for storing temporary variables or other intermediate information during execution of instructions to be executed by processor 144. Computer system 140 further includes a read only memory (ROM) 148 or other static storage device coupled to bus 142 for storing static information and instructions for processor 144. A storage device 150, such as a magnetic disk, flash memory or optical disk, is provided and coupled to bus 142 for storing information and instructions.

A communication interface 158 may be coupled to bus 142 for communicating information and command selections to processor 144. Interface 158 is a conventional serial interface such as an RS-232 or RS-422 interface. An external terminal 152 or other computer system connects to the computer system 140 and provides commands to it using the interface 158. Firmware or software running in the computer system 140 provides a terminal interface or character-based command interface so that external commands can be given to the computer system.

A switching system 156 is coupled to bus 142 and has an input interface and a respective output interface (commonly designated 159) to external network elements. The external network elements may include a plurality of additional routers 160 or a local network coupled to one or more hosts or routers, or a global network such as the Internet having one or more servers. The switching system 156 switches information traffic arriving on the input interface to output interface 159 according to pre-determined protocols and conventions that are well known. For example, switching system 156, in cooperation with processor 144, can determine a destination of a packet of data arriving on the input interface and send it to the correct destination using the output interface. The destinations may include a host, server, other end stations, or other routing and switching devices in a local network or Internet.

The computer system 140 implements as a router acting as a repair end point node, repairing node, or intermediate node the above described method of forwarding data. The implementation is provided by computer system 140 in response to processor 144 executing one or more sequences of one or more instructions contained in main memory 146. Such instructions may be read into main memory 146 from another computer-readable medium, such as storage device 150. Execution of the sequences of instructions contained in main memory 146 causes processor 144 to perform the process steps described herein. One or more processors in a multi-processing arrangement may also be employed to execute the sequences of instructions contained in main memory 146. In alternative embodiments, hard-wired circuitry may be used in place of or in combination with software instructions to implement the method. Thus, embodiments are not limited to any specific combination of hardware circuitry and software.

The term "computer-readable medium" as used herein refers to any medium that participates in providing instructions to processor 144 for execution. Such a medium may take many forms, including but not limited to, non-volatile media, volatile media. Non-volatile media includes, for example, optical or magnetic disks, such as storage device 150. Volatile media includes dynamic memory, such as main memory 146.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, EPROM, a FLASH-EPROM, any other memory chip or cartridge, or any other medium from which a computer can read.

Various forms of computer readable media may be involved in carrying one or more sequences of one or more instructions to processor 144 for execution. For example, the instructions may initially be carried on a magnetic disk of a remote computer. The remote computer can load the instructions into its dynamic memory and send the instructions over a telephone line using a modem. A modem local to computer system 140 can receive the data on the telephone line and use an infrared transmitter. An infrared detector coupled to bus 142 can receive the data and place the data on bus 142. Bus 142 carries the data to main memory 146, from which processor 144 retrieves and executes the instructions. The instructions received by main memory 146 may optionally be stored on storage device 150 either before or after execution by processor 144.

Interface 159 also provides a two-way data communication coupling to a network link that is connected to a local network. For example, the interface 159 may be an integrated services digital network (ISDN) card or a modem to provide a data communication connection to a corresponding type of telephone line. As another example, the interface 159 may be a local area network (LAN) card to provide a data communication connection to a compatible LAN. Wireless links may also be implemented. In any such implementation, the interface 159 sends and receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP). The ISP in turn provides data communication services through the world wide packet data communication network now commonly referred to as the "Internet".

Computer system 140 can send messages and receive data, including program code, through the network(s), network link and interface 159. In the Internet example, a server might transmit a requested code for an application program through the Internet, ISP, local network and communication interface 158. One such downloaded application provides for the method as described herein.

The received code may be executed by processor 144 as it is received, and/or stored in storage device 150, or other non-volatile storage for later execution.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Any appropriate routing protocol and mechanism and forwarding paradigm can be adopted to implement the invention. The method steps set out can be carried out in any appropriate order and aspects from the examples and embodiments described may be juxtaposed or interchanged as appropriate.

What is claimed is:

1. An apparatus implemented in a first router, comprising:
   a first network interface configured to couple the first router to a second router that is adjacent to both the first router and a third router in a data communications network having as components nodes and links therebetween;
   first logic which when executed is operable to receive, before the second router becomes unavailable, a standard network address and a repair address for a third network interface of the third router; wherein the repair address is different from the standard network address, and the repair address is to be used to deliver data packets from the first router to the third router if the second router becomes unavailable;
   second logic which when executed is operable to compute, before the second router becomes unavailable, a repair path from the first router to the repair address of the third network interface of the third router and around the second router on a primary forwarding path between the first router and the third router;
   third logic which when executed is operable to propagate the repair address along a label switched path (LSP), comprising the repair path, from the first router;
   fourth logic which when executed is operable to propagate, only to nodes along the repair path, and before the second router becomes unavailable, a Label Distribution Protocol (LDP) communication comprising a path vector identifying nodes on the repair path together with the repair address of the third network interface of the third router and a repair address label to a next node along the repair path.

2. An apparatus as claimed in claim 1, wherein the path vector identifies only nodes between the first router and the third router.

3. An apparatus as claimed in claim 1 further comprising a failure component which comprises at least one of a node, a link and a shared risk link group (SRLG).

4. An apparatus as claimed in claim 1, wherein the repair path is computed according to a link state protocol.

5. An apparatus as claimed in claim 4, in which the repair path is computed by performing an incremental shortest path first (iSPF) process rooted at the first router.

6. An apparatus as claimed in claim 1, further comprising logic which when executed is operable to compute whether a loop free alternate (LFA) repair path is available at the first router, to compute only a repair path from the first router and to propagate the repair address if no LFA is available.

7. An apparatus as claimed in claim 1, further comprising logic which when executed is operable to refresh the repair paths at intervals.

8. An apparatus as claimed in claim 7, further comprising logic which when executed is operable to withdraw unrefreshed paths.

9. A method, comprising:
   establishing, at a first router, communications to a data communications network having as components nodes and links therebetween;
   the first router:
   using a first network interface configured to couple the first router to a second router that is adjacent to both the first router and a third router in a data communications network;
   receiving, before the second router becomes unavailable, a standard network address and a repair address for a third network interface of the third router; wherein the repair address is different from the standard network address, and the repair address is to be used to deliver data packets from the first router to the third router if the second router becomes unavailable;
   computing, before the second router becomes unavailable, a repair path from the first router to the repair address of the third network interface of the third router and around the second router on a primary forwarding path between the first router and the third router;
   propagating the repair address along a label switched path (LSP), comprising the repair path, from the first router;
   propagating, only to nodes along the repair path and before the second router becomes unavailable, a Label Distribution Protocol (LDP) communication comprising a path vector identifying nodes on the repair path together with the repair address of the third network interface of the third router and a repair address label to a next node along the repair path;
   wherein the method is performed by one or more processors.

10. A method as claimed in claim 9, wherein the path vector identifies only nodes between the first router and the third router.

11. A method as claimed in claim 9, further comprising computing the repair path according to a link state protocol.

12. A method as claimed in claim 11, wherein the repair path is computed by performing an incremental shortest path first (iSPF) procedure rooted at the first router.

13. A method as claimed in claim 9, further comprising refreshing the repair paths at intervals.

14. A method as claimed in claim 9, further comprising computing whether a loop free alternate (LFA) repair path is available at the first router and only computing a repair path from the first router and propagating the repair address if no LFA is available.

15. A computer readable non-transitory storage medium storing one or more sequences of instructions which, when executed by one or more processors, cause the one or more processors to perform:
   establishing, at a first router, communications to a data communications network having as components nodes and links therebetween;
   coupling the first router to a second router that is adjacent to both the first router and a third router in the data communications network;
   receiving, before a second router becomes unavailable, a standard network address and a repair address for a third network interface of a third router; wherein the repair address is different from the standard network address, and the repair address is to be used to deliver data packets from the first router to the third router if the second router becomes unavailable;
   computing, before the second router becomes unavailable, a repair path from the first router to a repair address of the third interface of the third router around the second router on a primary forwarding path between the first router and the third router;

propagating the repair address along a label switched path (LSP), comprising the repair path, from the first router;

propagating, only to nodes along the repair path, and before the second router becomes unavailable, a Label Distribution Protocol (LDP) communication comprising a path vector identifying nodes on the repair path together with the repair address of the third network interface of the third router and a repair address label to a next node along the repair path.

16. A computer readable non-transitory storage medium as claimed in claim 15, wherein the path vector identifies only nodes between the first router and the third router, and wherein the third router comprises at least one of a node, a link and a shared risk link group (SRLG).

17. A computer readable non-transitory storage medium as claimed in claim 15, wherein the repair path is computed according to a link state protocol, and in which the repair path is computed by performing an incremental shortest path first (iSPF) process rooted at the first router.

18. A computer readable non-transitory storage medium as claimed in claim 15, further comprising instructions, which when executed, cause the one or more processors to perform: computing whether a loop free alternate (LFA) repair path is available at the first router, computing only a repair path from the first router and propagating the repair address if no LFA is available.

19. A computer readable non-transitory storage medium as claimed in claim 15, further comprising instructions, which when executed, cause the one or more processors to perform refreshing the repair paths at intervals.

* * * * *